Figure 1:
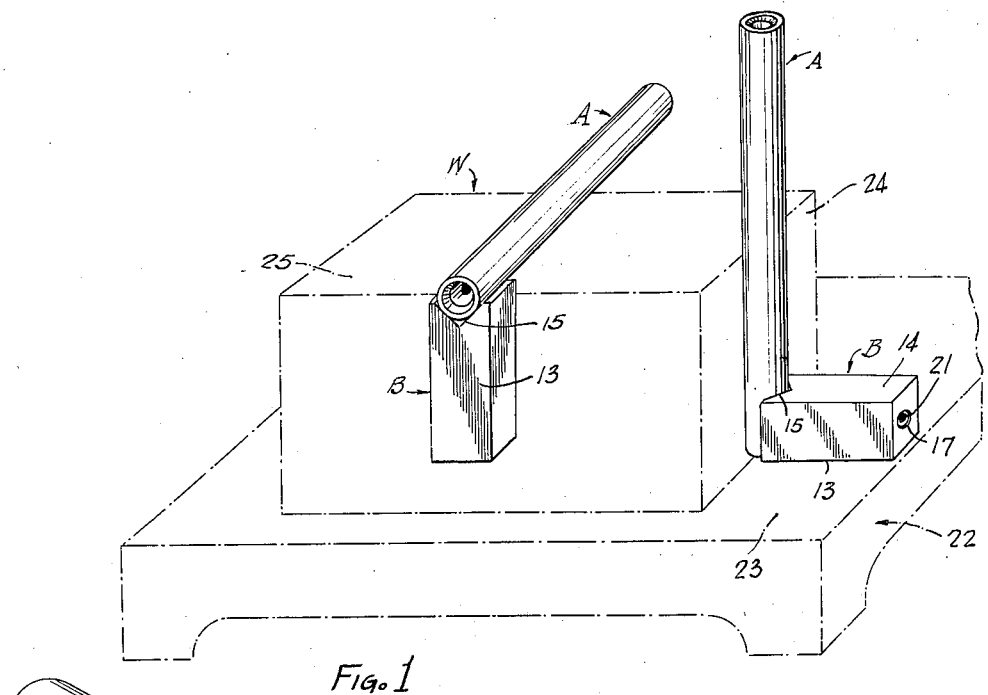

Aug. 10, 1943.   P. J. RENSEN   2,326,562
PRECISION SQUARE
Filed Feb. 19, 1941

INVENTOR.
PHILIP J. RENSEN.
BY Joshua RH Potts
ATTORNEY.

Patented Aug. 10, 1943

2,326,562

UNITED STATES PATENT OFFICE 2,326,562

PRECISION SQUARE

Philip J. Rensen, Philadelphia, Pa.

Application February 19, 1941, Serial No. 379,591

3 Claims. (Cl. 33—112)

This invention relates to squares, and is concerned primarily with a precision square such as is employed by toolmakers under conditions where a high degree of accuracy is required.

The present-day requirements of toolmaking and kindred arts dictate that accuracy, down to one-ten thousandths of an inch, be attained in the work. In view of these conditions, squares known as precision squares have been rendered available for testing the accuracy of work down to this small fractional part of an inch.

With a line contact between a leg of a square and the work, light will show through a space only one-ten thousandths of an inch wide, and a toolmaker is enabled to ascertain such discrepancies in the accuracy of his work. Accordingly, the trend which has been taken by those producing precision squares is to provide a square consisting of the usual two legs. One of these legs is formed with opposed parallel faces and constitutes the base of the square, while the other leg has generally taken the form of a blade providing a knife edge for engaging the work.

It has been possible for the manufacturers of these squares to guarantee the accuracy thereof down to one-ten thousandths of an inch, but only in the plane of the blade itself; that is, these blades are not guaranteed against warping. Under practical conditions of usage, the blade of a precision square will assume a warped or wavy condition. In such a state it is possible to make accurate tests only when the blade itself is exactly normal to the surface being tested. If the perpendicular should be departed from only a slight distance, the wave in the blade causes the edge thereof to assume such a relation with the work as to render accurate testing impossible.

It is obvious that under those conditions when it becomes necessary for the toolmaker to place the square over the work, it is almost impossible to determine accurately whether the blade itself is perpendicular to the surface being tested. Thus, a warping or waving of the blade destroys the ability of the square to make accurate tests.

With the foregoing conditions in mind, this invention has in view, as its foremost objective, the provision of a precision square that includes a base as one leg and a cylindrical member as the other leg. The cylindrical member will always provide a tangential line of contact with the work and may be produced so as to be substantially 100% proof against warping in all directions. Moreover, the cylindrical member may be ground down to the degree of accuracy required in a precision square of this character.

More in detail, this invention has as an object the provision of a precision square of the type above-noted in which the base includes, as essential elements, opposed parallel faces which are normal to the cylindrical leg. With such a base the square is adapted to function not only as a square which is placed over the work, but also as a gauge block which may be placed on a base plate with the cylindrical leg upstanding in a vertical position so that work to be tested may be placed thereagainst and on the base plate.

Yet another object of the invention is the provision of a precision square of the type above-noted in which the cylindrical leg comprises a thin wall tubular element. Inasmuch as these squares are intended to be handled and maintained by the toolmaker, it is important that their weight be held down to a minimum that is consistent with sufficient strength and rigidity to maintain accuracy. A thin wall tubular cylinder may be ground down to the degree of accuracy required, and the property of lightness is thus imparted to the square.

Another important benefit which attaches to a square including a thin wall tubular cylinder as one leg is that such a leg is rendered comparatively light as compared to the base to which it is attached. Thus, the square may be placed on a base plate with one face of the base in engagement with the base plate and the tubular cylinder in an upright vertical position. Under these conditions the comparatively greater weight of the base, as compared to the tubular cylinder, lowers the center of gravity so as to provide a desired high degree of stability.

Yet another object of the invention is the provision of a square of the character above-noted which includes improved and effective means for providing an accurate joinder between the base and the cylindrical leg. In accordance with this invention, the upper end of the base is provided with a notch formed by a pair of faces arranged to define a V. Such faces may be accurately milled and ground down so that the cylindrical member may be held thereagainst in desired relation to the base.

The base is formed with a passage through which a screw member extends, and this screw member has one end screwed into a tapped opening in the cylindrical member. It is evident that this screw member may be tightened to effectively clamp the cylindrical member against the faces defining the V, and thus accurately determine the relation between the two legs of the square.

Various other more details objects and advantages of the invention will in part become apparent and in part be hereinafter stated as the description of the invention proceeds.

The invention, therefore, comprises a precision square having two legs, one in the form of a base with opposite parallel faces, and the other in the form of a thin wall tubular cylinder that is clamped in a V-shaped notch in said base. The outer cylindrical surface of the tubular cylinder is ground down to a required degree of accuracy, and always presents a line contact with a surface being tested.

Figure 2:
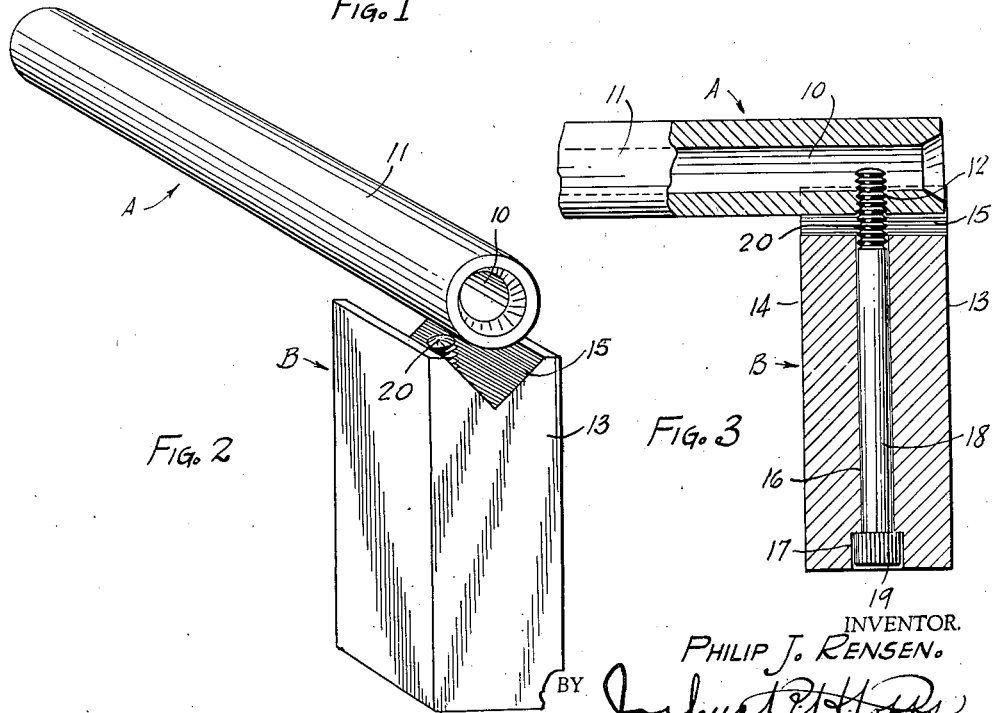
Figure 3:
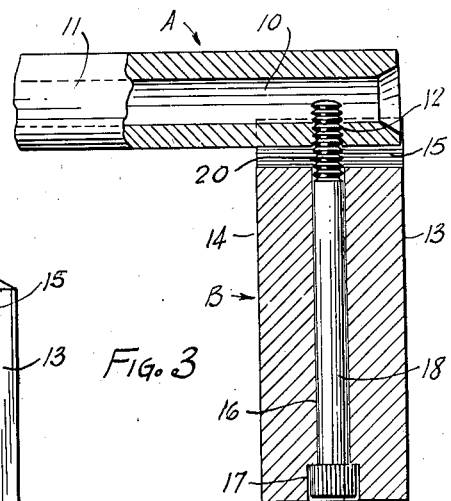

For a full and more complete understanding of the invention, reference may be had to the following description and accompanying drawing, wherein:

Figure 1 is a perspective view showing the manner in which the improved square of this invention may be employed to test the accuracy of certain work, Figure 2 is another perspective view showing the two legs of the square in exploded relation, and Figure 3 is a section through the square at the base.

Referring now to the drawing, wherein like reference characters denote corresponding parts, and first, more particularly to Figure 2, the precision square of this invention, is shown as comprising two legs A and B. The leg A takes the form of a thin wall tubular cylinder which presents an inner bore 10 and an outer cylindrical surface 11. This outer cylindrical surface 11 may be ground down to a high degree of accuracy.

Under conditions actually existent today, flaws as small as one-ten thousandths of an inch are detectable in the cylindrical surface 11 and may be removed by modern grinding and lapping operations. Adjacent one end the wall of the leg is formed with an opening 12 which is tapped to provide a threaded socket which is employed in securing the leg A to the base B in the manner to be hereinafter pointed out.

The leg B constitutes the base of the square and includes, as essential elements, opposed parallel faces 13 and 14. One end of the square is notched to form faces 15 which assume a V relation, which, preferably, is about 90°. A passageway 16 is formed in the base B and terminates at one end midway of the apex of the V, defined by faces 15. At the other end, the opening 16 is enlarged to provide a counterbore 17 that is intended to accommodate the head of a screw bolt.

A screw bolt designated 18 carries a head 19 at one end which is received in the counterbore 17 and its other end is formed with screw threads 20 which are screwed into the tapped opening 12. The head 19 is preferably formed with a non-circular opening at 21 (see Figure 1) which is intended to constitute a wrench-engaging socket. Thus, with one end of the leg A positioned in the notch defined by faces 15, and with the opening 12 in alignment with the passageway 16, the screw bolt 18 may be inserted into the passageway 16 and the screw threads 20 screwed into the tapped opening 12. As the bolt is threaded home and tightened under the influence of a wrench which is placed in the socket 21, the cylindrical leg A is tightly clamped against the faces 15.

Referring now more particularly to Figure 1, the two main methods of employing the precision square heretofore described may be outlined. A base plate is shown at 22 and has a top face 23 which is machined down to a high degree of accuracy. Base plates such as this are now well-known and available to tool-makers. The square comprising the legs A and B may be placed on the face 23 of the base plate with the surface 13 of the base B engaging the face 23. Under this arrangement, the leg A assumes the vertical upright position illustrated.

A piece of work designated W having a face 24, the accuracy of which is to be tested, may now be placed on the face 23 of the base plate and brought into engagement with the outer cylindrical surface 11 of the leg A. The cylindrical formation insures of a line contact with the work, regardless of the angle at which the work W approaches and contacts the leg A. As above pointed out, light will show through the line of contact if inaccuracies as small as one-ten thousandths of an inch exist.

The other mode of usage of the improved precision square of this invention is also depicted in Figure 1. Assume that the work W has a face at 25, the accuracy of which is to be tested. The square may be taken to the work by placing it in the position in which the face 14 of the base B engages the side of the work W. The cylindrical surface 11 of the leg A will be brought into contacting engagement with the face 25 to make the required test for accuracy and it is important to note that it is not necessary that the base B assume an exactly vertical position. Regardless of the angular relation of this base B to the face 25 being tested, there will always be a line contact between the cylindrical leg A and the surface 25 of the work W.

It is evident that the cylindrical leg A is not subject to warping in any dimension and thus assurance is had that the accuracy of the surface 11 will be maintained at all times.

While a preferred specific embodiment of the invention is hereinbefore set forth, it is to be clearly understood that I am not to be limited to the exact construction illustrated and described, because various modifications of these details may be provided in putting the invention into practice, within the purview of the appended claims.

I claim:

1. A precision square comprising a base having opposed parallel faces, a V-shaped notch in one end of said base extending between said faces and including an apex, said base being formed with a passageway extending from said apex to the other end of said base, a thin wall tubular cylindrical leg having outer wall portions at one end received in and engaging the faces of said notch, the wall of said tubular cylindrical leg being formed with a threaded opening in alignment with said passageway, and a screw bolt in said passageway having an end screwed into said threaded opening and clamping said cylindrical leg against the faces of said notch.

2. A precision square, comprising a base having inner and outer parallel gauging faces and being formed with a V-shaped notch extending between said faces, said notch being defined by a pair of complemental flat faces in angular relation to each other, a cylindrical gauging leg arranged in transverse relation to said gauging faces and having a part received in said notch and means for securing said gauging leg to said base with that portion of the leg received in said notch firmly held against the faces of said notch.

3. A precision square of the character described, comprising a base having inner and outer parallel gauging faces and being formed with a notch extending between said faces, said notch being defined by a pair of complemental flat faces meeting in an apex, a cylindrical gauging leg arranged in transverse relation to said gauging faces and having a part received in said notch and screw means arranged substantially centrally between said gauging faces for securing said leg to said base with the cylindrical surface of the part received in the notch firmly held against the faces of said notch.

PHILIP J. RENSEN.